United States Patent [19]

Rieger et al.

[11] 4,320,620
[45] Mar. 23, 1982

[54] ARRANGEMENT FOR FASTENING A STRUCTURAL PART TO A ROUND STEEL CHAIN

[75] Inventors: Werner Rieger; Horst Elsässer, both of Aalen-Unterkochen; Hartwig Zenker, Lauchheim; Alfred Bittlingmaier, Aalen-Ebnat; Hans H. Dalferth, Aalen-Wasseralfingen, all of Fed. Rep. of Germany

[73] Assignee: RUD-Kettenfabrik Rieger & Dietz GmbH u. Co., Aalen, Fed. Rep. of Germany

[21] Appl. No.: 156,049

[22] Filed: Jun. 3, 1980

[30] Foreign Application Priority Data

Jun. 15, 1979 [DE] Fed. Rep. of Germany ....... 2924721

[51] Int. Cl.³ ........................................... F16G 15/00
[52] U.S. Cl. ....................................... 59/93; 403/287; 403/388; 198/731
[58] Field of Search .................... 59/93, 86; 198/731, 198/712, 648; 403/287, 389, 390, 391, 388

[56] References Cited

U.S. PATENT DOCUMENTS 2,092,372  4/1933  Goeller ........................... 403/391 X
4,161,100  7/1979  Dalferth et al. ........................ 59/93

FOREIGN PATENT DOCUMENTS 2134403  1/1973  Fed. Rep. of Germany ...... 198/731

Primary Examiner—Wayne L. Shedd
Attorney, Agent, or Firm—Parmelee, Johnson, Bollinger & Bramblett

[57] ABSTRACT

In an arrangement for fastening a structural part (1) to a round steel chain by means of two webs (3,6) which overlap the long sides (19,20) of a chain link (9) and bridge the gap between said long sides (19,20) a centering member (5) is used which centering member is provided with a bore (12) and parallel side faces (10,11) having a spacing from one another which is approximately equal to the width of the gap between the long sides (19,20) of the chain link (9) partially overlapped by the webs (3,6). At least one web (3) being provided with a guide (4) which holds the centering member (5) in a prescribed position.

5 Claims, 11 Drawing Figures

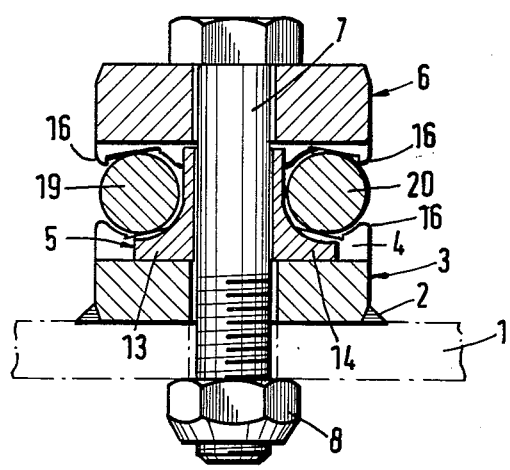
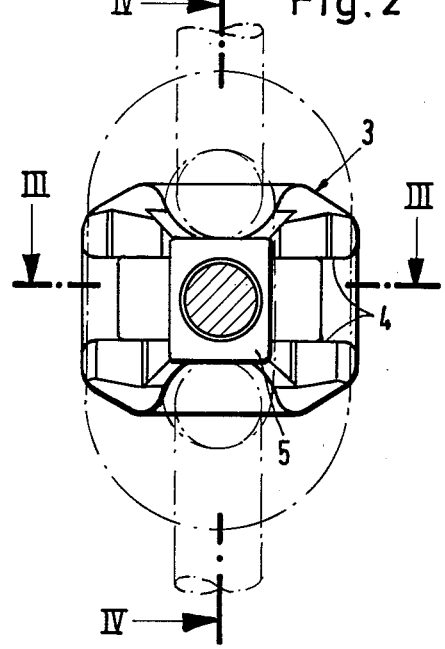
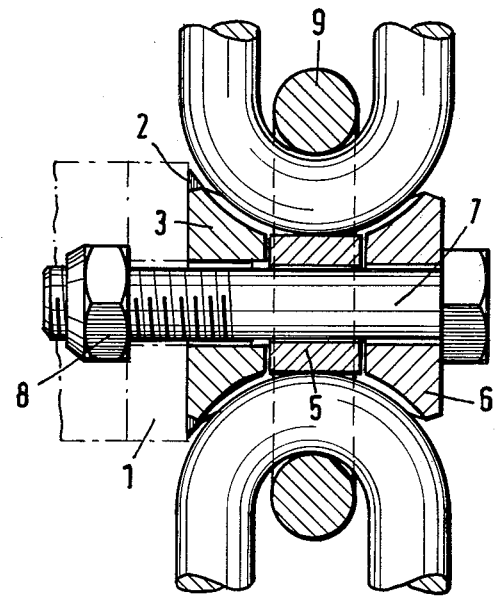

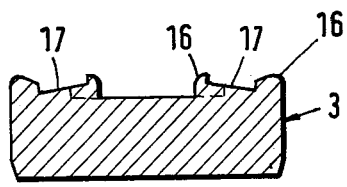
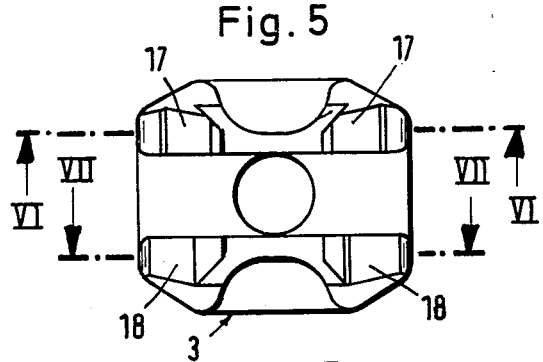
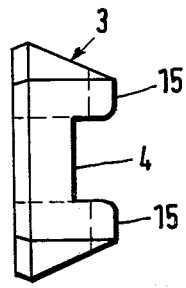
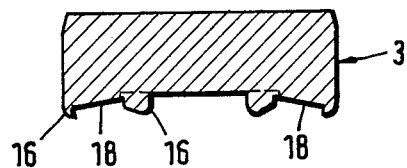
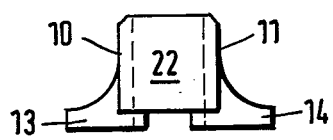
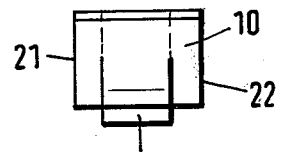
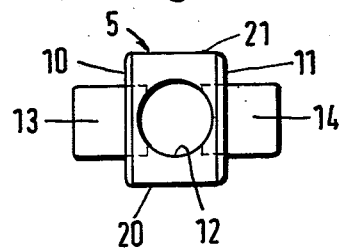

ARRANGEMENT FOR FASTENING A STRUCTURAL PART TO A ROUND STEEL CHAIN

The invention starts from an arrangement for fastening a structural part, especially a scraper, to a round steel chain by means of two webs which overlap the long sides of a chain link and are contractible by means of a clamping screw passing through the inner space of the chain link, each of said webs having, viewed in the longitudinal direction of the chain link, two clamping jaw pairs arranged behind one another for the long sides of the link, the clamping faces of the first clamping jaw pair of the one web sloping towards the web center and the clamping faces of the first clamping jaw pair of the other web sloping towards the web margin, whilst the clamping faces of the second clamping jaw pair of the one web slope towards the web margin and the clamping faces of the second clamping jaw pair of the other web slope towards the web center.

A known such arrangement (German Pat. Specification No. 1,922,146) lacks means which guarantee an optimal positioning of the webs in relation to the chain link gripped over by them. Neither slight inclinations of the chain link between the web pair nor a central arrangement of the short sides of the chain link in relation to the clamping screw can be achieved with certainty during assembly.

The object of the invention is to improve an arrangement of the type specified before so that the webs always clamp the chain link firmly in a precisely defined position.

This object is achieved according to the invention thereby that between the webs is arranged a centering member with parallel side faces which is provided with a bore for the clamping screw and whose ends form stops for the short sides of the chain links connected to the chain link bridged by the webs and whose side faces have a spacing from one another which is approximately equal to the inside width $b_i$ of the chain link gripped round by the webs and in that at least one of the webs is provided with a guide which holds the centering member in a position in which its side faces run parallel to the longitudinal axis of the round steel chain.

Advantageous developments conducive to achieving this object are claimed in sub-claims 2–7.

The solution according to the invention offers the advantage that, as a result of the use of a centering member known per se from German Offenlegungsschrift No. 2,710,550 (corresponding to U.S. Pat. No. 4,161,100) and the construction and arrangement of this centering member in the assembly of the webs, there necessarily arises an alignment of the chain link with the webs which guarantees an optimal loading of the fastening arrangement.

The invention is described in detail below with reference to an exemplary embodiment illustrated in the attached drawing in which:

FIG. 2 is a plan view of the lower web of the fastening arrangement according to FIG. 1, with inserted centering member;

FIG. 3 is a section along the line III—III of FIG. 2;

FIG. 4 is a section along the line IV—IV of FIG. 2;

FIG. 5 is a plan view of the web provided with a guide for the centering member;

FIG. 6 is a section along the line VI—VI of FIG. 5;

FIG. 7 is a section along the line VII—VII of FIG. 5;

FIG. 8 is a side view of the web according to FIG. 5;

FIG. 9 is a plan view of the centering member;

FIG. 10 is an end view of the centering member according to FIG. 9, and

FIG. 11 is a side view of the centering member according to FIGS. 9 and 10.

Figure 1:
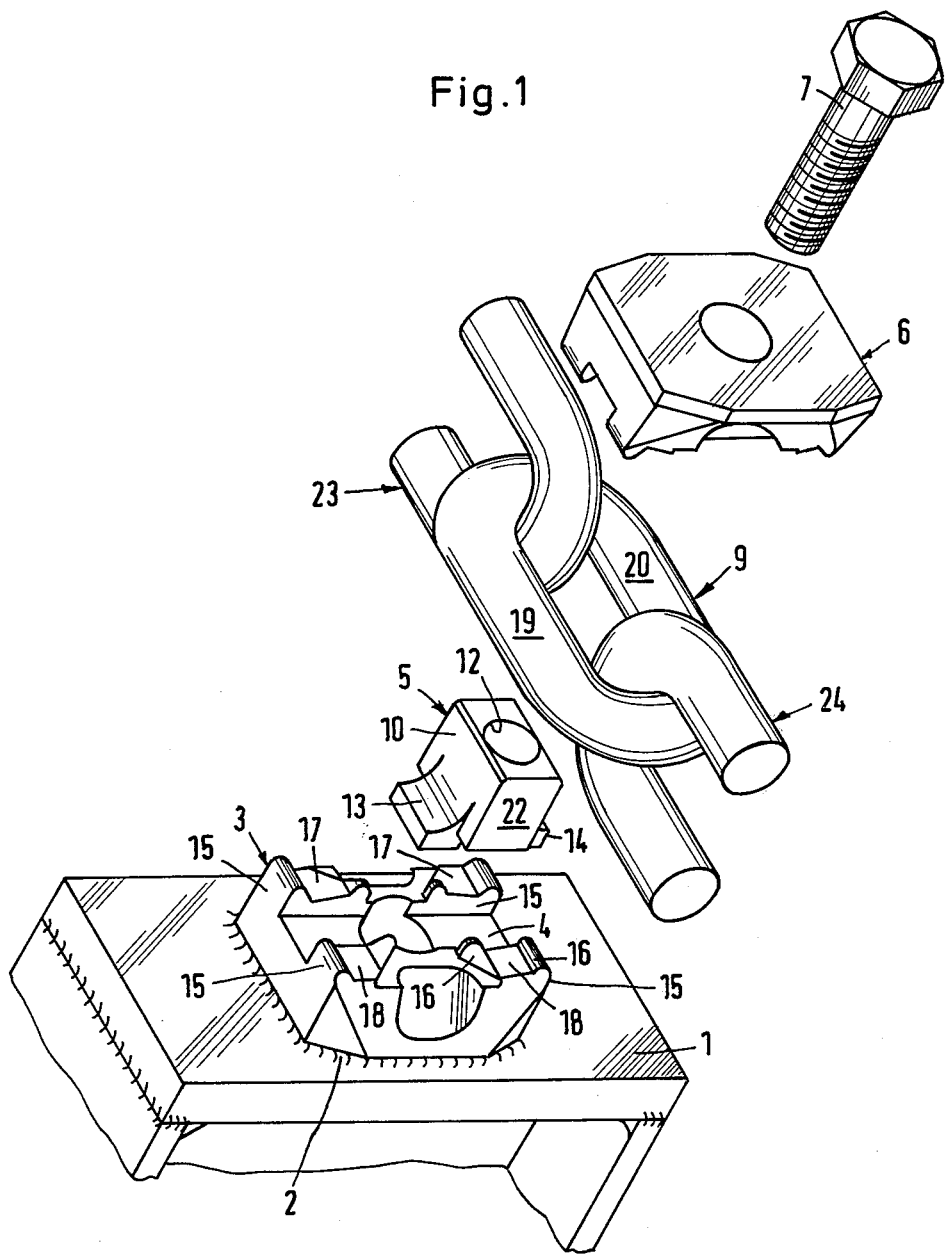
FIG. 1 is an exploded view of an arrangement for fastening a scraper to a round steel chain.

In FIG. 1 a structural part forming a scraper is designated by 1. Connected to this structural part by means of a welded seam 2 is a first web 3 which is provided with a guide 4 for receiving a centering member 5. A chain link 9 can be clamped between the web 3 and a web 6 by means of a clamping screw 7 to which a nut 8 is assigned (see FIGS. 3 ad 4).

The centering member 5 possesses a basic body with parallel side faces 10 and 11 and a bore 12 for the clamping screw 7. Pedestal-like projections 13 and 14 adjoining the basic body engage into the guide 4 and prevent the centering member 5 from turning about the center axis of the clamping screw 7.

Each web is provided with four clamping jaws 15 which have clamping faces 17 limited by guide beads 16 and sloping towards the margin and having clamping faces 18 sloping towards the web center. Two clamping faces 18 of the web 3 which slope towards the web center have assigned to them two clamping faces 17 of the web 6 which slope towards the web margin, while clamping faces 18 on the web 6 which slope towards the web center lie opposite the clamping faces 17 of the web 3 which slope towards the web margin.

Because the side faces 10 and 11 of the centering member 5 forming guide faces for the long sides 19 and 20 of the chain link 9 and the end faces 21 and 22 form stops for the short sides of the chain links 23 and 24 connected to the chain link 9, the chain link 9 automatically assumes, when the fastening arrangement is assembled, its prescribed desired position in which its longitudinal axis is aligned with the longitudinal axis of the round steel chain.

Due to the fact that, as can be seen in FIG. 3, the projections 13 and 14 engage under the long sides 19 and 20 of the chain link 9, it is possible to use a bore 12 with a large diameter. The centering member has sufficient strength even if the spacing between its side faces 10 and 11 is equal to the diameter of the clamping screw 7 and if the side faces, in the upper region of the basic body, are provided with central recesses. Due to the guidance of the centering member 5 in the guide 4 a transmission of transverse forces to the clamping screw 7 is prevented. The chosen arrangement of the centering member also counteracts an undesirable loosening of the clamping screw.

What we claim is:

1. In an arrangement for fastening a structural part, especially a scraper, to a round steel chain in which two webs having, viewed in the longitudinal direction of the chain link, two clamping jaw pairs arranged behind one another are clamped across the two long sides of a chain link by a clamping screw which penetrates through the link and through a centering member with parallel side faces whose ends form stops for the short sides of two adjacent chain links connected to the chain link bridged by the webs and whose side faces have a spacing from one another which is approximately equal to the inside width $b_i$ of the chain link passed through by the clamping screw, the improvement comprising:

at least one (3) of the webs (3,6) is provided with a guide (4) which is formed by a recess on the side of the web (3) facing the chain link (9) bridged by the webs (3,6), and that the centering member (5) is provided with projections (13,14) engaging into said recess (4).

2. Arrangement according to claim 1, wherein the projections (13,14) are made pedestal-like and reach between the clamping jaws (15,18) of the webs (3,6) under the two long sides of the chain link (9) bridged by the webs (3,6).

3. Arrangement according to claims 1 or 2, wherein the clamping jaws (15) are provided with guide beads (16) for preadjustment of the chain link (9) bridged by the webs (3,6).

4. Arrangement according to claims 1 or 2, wherein the guide (4) is a groove.

5. Arrangement according to claims 1 or 2, wherein the web (3) provided with the guide (4) is connected by welding to the structural part (1) to be fastened to the chain strand by the clamping screw (7) passing through a bore in the structural part (1).

* * * * *